United States Patent
Feng

(10) Patent No.: US 11,409,333 B2
(45) Date of Patent: Aug. 9, 2022

(54) FOLDABLE DISPLAY DEVICE

(71) Applicant: Wuhan China Star Optoelectronics Semiconductor Display Technology Co., Ltd., Wuhan (CN)

(72) Inventor: Zikang Feng, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 16/771,235

(22) PCT Filed: Dec. 20, 2019

(86) PCT No.: PCT/CN2019/126945
§ 371 (c)(1),
(2) Date: Jun. 10, 2020

(87) PCT Pub. No.: WO2021/042629
PCT Pub. Date: Mar. 11, 2021

(65) Prior Publication Data
US 2022/0187876 A1    Jun. 16, 2022

(30) Foreign Application Priority Data
Sep. 5, 2019   (CN) .......................... 201910836189.0

(51) Int. Cl.
*G06F 1/16*    (2006.01)
(52) U.S. Cl.
CPC .......... *G06F 1/1681* (2013.01); *G06F 1/1616* (2013.01); *G06F 1/1652* (2013.01)

(58) Field of Classification Search
CPC combination set(s) only.
See application file for complete search history.

(56) References Cited

U.S. PATENT DOCUMENTS

| | | | |
|---|---|---|---|
| 9,119,316 B2* | 8/2015 | Lee | H05K 7/16 |
| 9,250,733 B2* | 2/2016 | Lee | G06F 1/1641 |
| 9,348,450 B1* | 5/2016 | Kim | G06F 1/1616 |
| 9,470,404 B2* | 10/2016 | Lee | G09F 9/301 |
| 10,028,395 B2* | 7/2018 | Chen | G06F 1/1626 |
| 10,104,787 B2* | 10/2018 | Rothkopf | G06F 1/1652 |
| 10,111,346 B2 | 10/2018 | Seo et al. | |
| 10,168,734 B2* | 1/2019 | Sun | G06F 1/1652 |
| 10,188,004 B2* | 1/2019 | Yeh | G06F 1/1652 |
| 10,487,550 B2* | 11/2019 | Chu | G06F 1/16 |

(Continued)

FOREIGN PATENT DOCUMENTS

| | | |
|---|---|---|
| CN | 105830140 A | 8/2016 |
| CN | 107818735 A | 3/2018 |

(Continued)

*Primary Examiner* — Lisa Lea-Edmonds
(74) *Attorney, Agent, or Firm* — Menachem Nathan; Nathan & Associates

(57) ABSTRACT

The disclosure provides a foldable display device comprising a flexible display panel, a foldable mechanism, a support, and a driving mechanism. The driving mechanism includes two base plates and a fixing part. The flexible display panel is located on the two base plates. The flexible display panel when in an unfolded state is located on the fixing part. When the flexible display panel is in a folded state, a portion of the flexible display panel enters into a cavity of the fixing part through an opening.

12 Claims, 8 Drawing Sheets

(56) References Cited

U.S. PATENT DOCUMENTS

| | | | |
|---|---|---|---|
| 10,520,989 B1* | 12/2019 | Hsu | G06F 1/1616 |
| 10,520,992 B1* | 12/2019 | Chang | G06F 1/1616 |
| 10,550,880 B2* | 2/2020 | Hsu | F16C 11/04 |
| 10,686,028 B2* | 6/2020 | Ahn | G06F 1/1681 |
| 10,761,573 B2* | 9/2020 | Hsu | G06F 1/1681 |
| 10,768,667 B2* | 9/2020 | Lin | H04M 1/0216 |
| 10,795,415 B2* | 10/2020 | Cavallaro | B32B 7/12 |
| 10,880,416 B2* | 12/2020 | Li | E05D 11/0054 |
| 11,086,356 B2* | 8/2021 | Hou | H04M 1/0268 |
| 11,137,801 B2* | 10/2021 | Park | G06F 1/1635 |
| 11,240,920 B2* | 2/2022 | Jeon | H05K 5/0217 |
| 11,246,228 B2* | 2/2022 | Kim | G06F 1/1681 |
| 2018/0077808 A1 | 3/2018 | Seo et al. | |
| 2019/0369671 A1 | 12/2019 | Seo et al. | |
| 2021/0159441 A1* | 5/2021 | Kwon | H01L 51/56 |
| 2021/0341972 A1* | 11/2021 | Togashi | G06F 1/1652 |

FOREIGN PATENT DOCUMENTS

| | | |
|---|---|---|
| CN | 207977989 U | 10/2018 |
| CN | 109451685 A | 3/2019 |
| CN | 208656822 U | 3/2019 |
| CN | 109658826 A | 4/2019 |
| CN | 209070886 U | 7/2019 |
| CN | 110138916 A | 8/2019 |
| KR | 20190067401 A | 6/2019 |

\* cited by examiner

FOLDABLE DISPLAY DEVICE

CROSS REFERENCE TO RELATED APPLICATIONS

This application claims the priority to International Application No. PCT/CN2019/126945, filed on Dec. 20, 2019, titled "FOLDABLE DISPLAY DEVICE", which claims the priority of Chinese Patent Application No. 201910836189.0, filed on Sep. 5, 2019, entitled "FOLDABLE DISPLAY DEVICE" in the China Intellectual Property Office, the disclosure of which is incorporated herein in its entirety by reference.

BACKGROUND OF INVENTION

Field of Invention

The invention relates to the technical field of display technologies, and in particular to a foldable display device.

Description of Prior Art

Flexible organic light emitting diodes (OLEDs) have increasingly attracted wide attention for bendability and pliability characteristics. Most foldable display devices with flexible OLEDs have a folding mechanism for folding inwardly and folding outwardly. In an infoldable display device, as an inner surface of a support mechanism that supports the flexible display shrinks with bending of the display device, and as a consequence, cannot match the size of the flexible display properly, the support mechanism may squeeze the bended part of the flexible display during bending of the display device, and cause damage or failure to the flexible display.

SUMMARY OF INVENTION

Technical Problems

During inwardly folding operation of an foldable display device, the support mechanism may squeeze the bended part of the flexible display during bending of the display device, and even cause damage or failure to the flexible display.

Technical Solutions

An embodiment of the invention provides a foldable display device comprising:
a flexible display panel; and
a foldable mechanism comprising two base plates and a fixing part, wherein the flexible display panel is located on and connected to the two base plates.

The two base plates are separately located at left side and right side of the fixing part, and pivotally connected to the fixing part. The base plates rotate around a first direction to transit the flexible display panel to a folded state or an unfolded state. A cavity is formed in the fixing part, an opening is formed on an upper part of the cavity. The flexible display panel in the unfolded state is located on the fixing part. A portion of the flexible display panel enters into the cavity through the opening when the flexible display panel is in the folded state.

In some embodiments of the invention, the foldable display device further comprises a support and a driving mechanism.

The support is located in the cavity of the fixing part. When the flexible display panel is in a flat state, the support is located at the opening.

The driving mechanism comprises a first driver portion located on the base plates, and a second driver portion located on the support, wherein the first driver portion and the second driver portion cooperatively drive the support to slide down when the two base plates rotate around the first direction to a closed position where the two base plates are close to each other.

In some embodiments of the invention, the first driver portion is connected to the base plates through a connecting component, the first driver portion and the second driver portion are slidably connected and slidable along a second direction which is in parallel with a lower surface of the fixing part and perpendicular to the first direction, and the first driver portion is located between a pivot of one of the base plates and a pivot of the other one of the base plates.

In some embodiments of the invention, the driving mechanism forms a set of the driving mechanism, and the first driver portion of the driving mechanism is located on one of the base plates.

In some embodiments of the invention, the driving mechanism forms two sets of the driving mechanisms, and the first driver portion of one of the two sets of the driving mechanisms is located on one of the base plates, and a first driver portion of the other one of the two sets of the driving mechanisms is located on the other one of the base plates.

In some embodiments of the invention, the support comprises an upper support part, a lower support part, and a connecting component connecting the upper support part and the lower support part, and the first driver portion is located between the upper support part and the lower support part.

In some embodiments of the invention, an outer surface of the upper support part is in a same plane with an outer surface of the base plates when the foldable mechanism is in an unfolded state.

In some embodiments of the invention, a dimension and a shape of the outer surface of the upper support part match a dimension and a shape of the opening.

In some embodiments of the invention, the flexible display panel comprises a fixed area and a bendable area, and when the foldable mechanism is in the unfolded state, the fixed area is affixed to the base plates, and the bendable area is detachably located on the upper support part.

In some embodiments of the invention, a cross section of the connecting component is in a hook shape, an opening for passing through by the corresponding connecting component is formed a side of the lower support part closing to the connecting component, and when the foldable mechanism is in the unfolded state, the connecting component has one end connected to the first driver portion through the opening, and the other end connected to the base plates.

In some embodiments of the invention, a cross section of the fixing part is in a shape of "U."

In some embodiments of the invention, the support is connected to a sliding lever, a fixed lever is located at a bottom of the fixing part and has a sliding track that matches the sliding lever for sliding up and down of the sliding lever.

Useful effects:

When the foldable mechanism is in the unfolded state, the flexible display panel is also in an unfolded state, where a bended part of the flexible display panel is supported by the support. When the foldable mechanism is in the folded state, the flexible display panel is bended, the two base plates rotate around the first direction and are close to each other during a folding operation of the foldable mechanism, and the first driver portion and the second driver portion cooperatively drive the support to slide along a direction away from the opening and give way to the bended part of the flexible display panel. Thus, the support may be prevented from squeezing the bended part of the flexible display panel during bending of the flexible display panel, and causing damage or failure to the flexible display panel.

BRIEF DESCRIPTION OF DRAWINGS

To clear disclose the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

REFERENCE MARKS IN THE DRAWINGS

Figure 1:
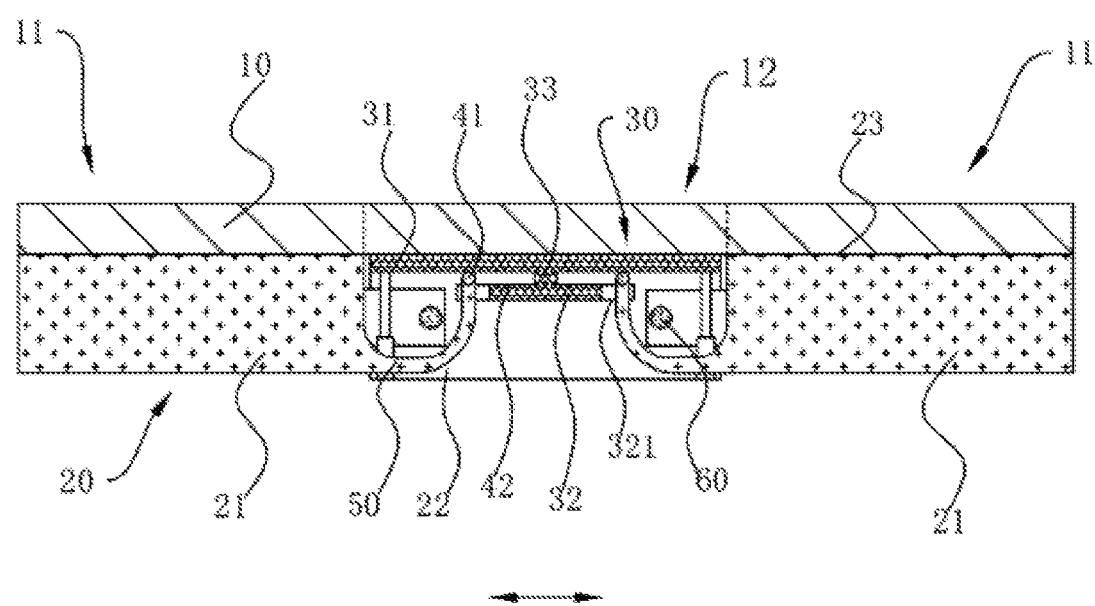
FIG. 1 is a structural view showing a foldable display device in an unfolded state according to an embodiment of the disclosure.

10: flexible display panel; 11: fixed areas; 12: bendable area; 20: foldable mechanism; 21: base plates; 22: fixing part; 221: opening; 23: supporting plane; 30: support; 31: support part; 32: lower support part; 321: opening; 33: connecting component; 41: first driver portion; 42: second driver portion; 50: connecting component; 60: pivot; 70: connection plates; 80: sliding lever; 90: fixed lever; 91: sliding track.

DETAILED DESCRIPTION OF PREFERRED EMBODIMENTS

The description of embodiments in the following is to illustrate specific embodiments of the present invention with reference to the accompany drawings. The directional terms mentioned in the present invention, such as "upper", "lower", "before", "after", "left", "right", "inside", "outside", and "side" just refer to directions in the drawings. Therefore, the directional terminology is used for the purpose of illustration and understanding of the invention, and not used for limiting the invention. In the drawings, a similarly structured units are represented by the same label.

The invention is to address the problem that the support may squeeze the bended part of the flexible display panel during bending of the display device, and cause damage or failing to the flexible display. The invention may be used to solve the problem.

As shown in FIG. 1, a foldable display device includes a flexible display panel 10, a foldable mechanism 20, a support 30, and a driving mechanism.

Specifically, the foldable mechanism 20 includes two base plates 21 and a fixing part 22. The flexible display panel 10 is located on and connected to the two base plates 21. The two base plates 21 are separately located at a left side and a right side of the fixing part 22, and pivotally connected to the fixing part 22. The base plates 21 rotate around a first direction to transit the flexible display panel 10 to a folded state or an unfolded state.

Note that, when the foldable mechanism 20 is in an unfolded state, the flexible display panel 10 is also in the unfolded state. When the foldable mechanism 20 is in a folded state, the flexible display panel 10 is also in the folded state.

Specifically, a cavity is formed in the fixing part 22 and has an opening on top of the cavity. That is, the opening is formed on an upper part of the fixing part 22. The flexible display panel 10 in the unfolded state is located on the fixing part 22. A portion of the flexible display panel 10 enters into the cavity through the opening when the flexible display panel 10 is in the folded state.

Note that, as shown in FIG. 1, the foldable mechanism 20 has a supporting plane 23. When the two base plates 21 rotate to a horizontal position, an upper side of the two base plates 21 forms the supporting plane, where the flexible display panel 10 is in the unfolded state, and located on the supporting plane 23 of the foldable mechanism 20.

Specifically, the support 30 is located in the cavity of the fixing part 22. When the flexible display panel 10 is in a flat state, the support 30 is relocated at the opening.

Further, the support 30 is slidably connected to the fixing part 22 to slide up and down.

Specifically, the driving mechanism comprises a first driver portion 41 located on the base plates 21, and a second driver portion 42 located on the support 30, where the first driver portion 41 and the second driver portion 42 cooperatively drive the support 30 to slide down when the two base plates 21 rotate around the first direction to a closed position where the two base plates are close to each other.

When the foldable mechanism 20 is in the unfolded state, the flexible display panel 10 is also in the unfolded state, where the flexible display panel 10 is supported by the base plates 21 and the support 30. When the foldable mechanism 20 is in the folded state, the flexible display panel 10 is bended, the two base plates 21 rotate around the first direction and are close to each other during a folding operation of the foldable mechanism 20, and the first driver portion 41 and the second driver portion 42 cooperatively drive the support 30 to slide down. Thus, the support 30 may be prevented from squeezing the bended part of the flexible display panel 10 and causing damage or failure to the flexible display panel 10 during bending of the flexible display panel 10.

Further, the first driver portion 41 is connected to the base plates 21 through a connecting component 50. The first driver portion 41 and the second driver portion 42 are slidably connected and slidable along a second direction which is in parallel with a lower surface of the fixing part 22 and perpendicular to the first direction. The first driver portion 41 is located between a pivot 60 of one of the base plates 21 and a pivot 60 of the other one of the base plates 21.

Note that, as shown in FIG. 1, the fixing part 22 has a lower surface in parallel to the supporting plane 23, and a direction represented by an arrow is the second direction.

Further, the support 30 comprises an upper support part 31, a lower support part 32, and a connecting component 33 connecting the upper support part 31 and the lower support part 32. The first driver portion 41 is located between the upper support part 31 and the lower support part 32.

In an embodiment, the second driver portion 42 is located in a chute between the upper support part 31 and the lower support part 32. The chute extends along the second direction. The connecting component 33 includes a slider in the chute. The slider matches with the chute and can slide along the chute.

In an embodiment, an outer surface of the upper support part 31 is in a same plane with an outer surface of the base plates 21 when the foldable mechanism 20 is in the unfolded state.

Further, a dimension and a shape of the outer surface of the upper support part 31 match a dimension and a shape of the opening.

In an embodiment, the flexible display panel 10 comprises fixed areas 11 and a bendable area 12. When the foldable mechanism 20 is in the unfolded state, the fixed areas 11 are affixed to the base plates 21, and the bendable area 12 is detachably located on the upper support part 31.

When the flexible display panel 10 is in the unfolded state, the upper support part 31 supports the bendable area 12 of the flexible display panel 10 to prevent from perceivable surface subsidence of the bendable area 12 of the flexible display panel 10 against touches, and to improve user experiences. When the foldable mechanism 20 is bended, the support 30 moves down, the bendable area 12 of the flexible display panel 10 detaches from the upper support part 31 to prevent damages.

In an embodiment, the driving mechanism forms two sets of the driving mechanisms. The first driver portion 41 of one of the two sets of the driving mechanisms is located on one of the base plates 21, and the first driver portion 41 of the other one of the two sets of the driving mechanisms is located on the other one of the base plates 21.

The two sets of the driving mechanisms cooperate to provide mechanical linkage between the two base plates 21, where rotation of one base plate 21 drives the other base plate 21 to rotate.

Figure 2:
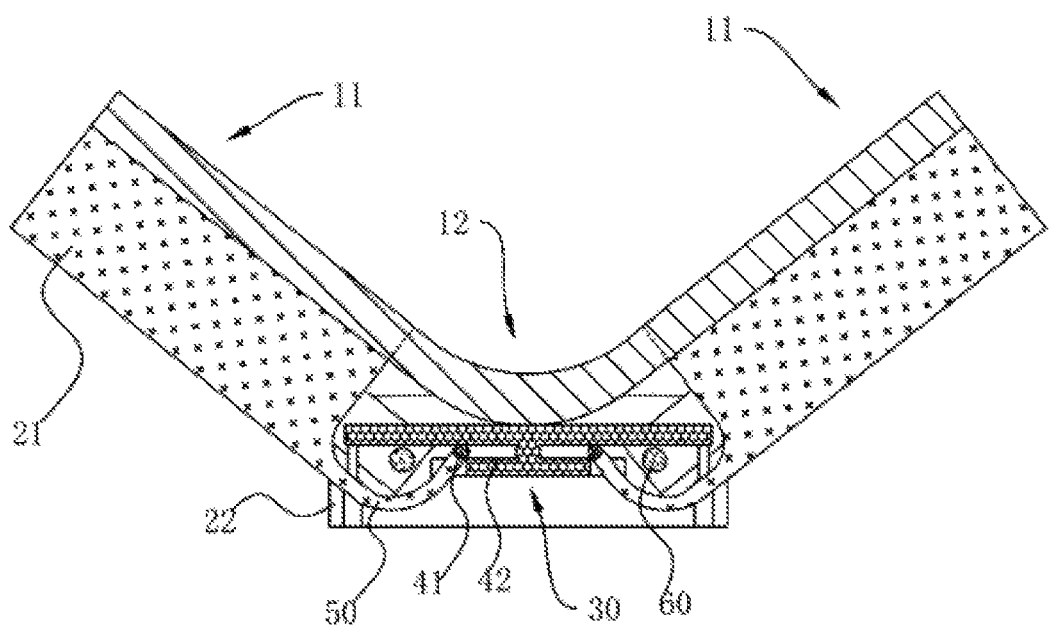
FIG. 2 is a structural view showing the foldable display device in a folded state.
Figure 3:
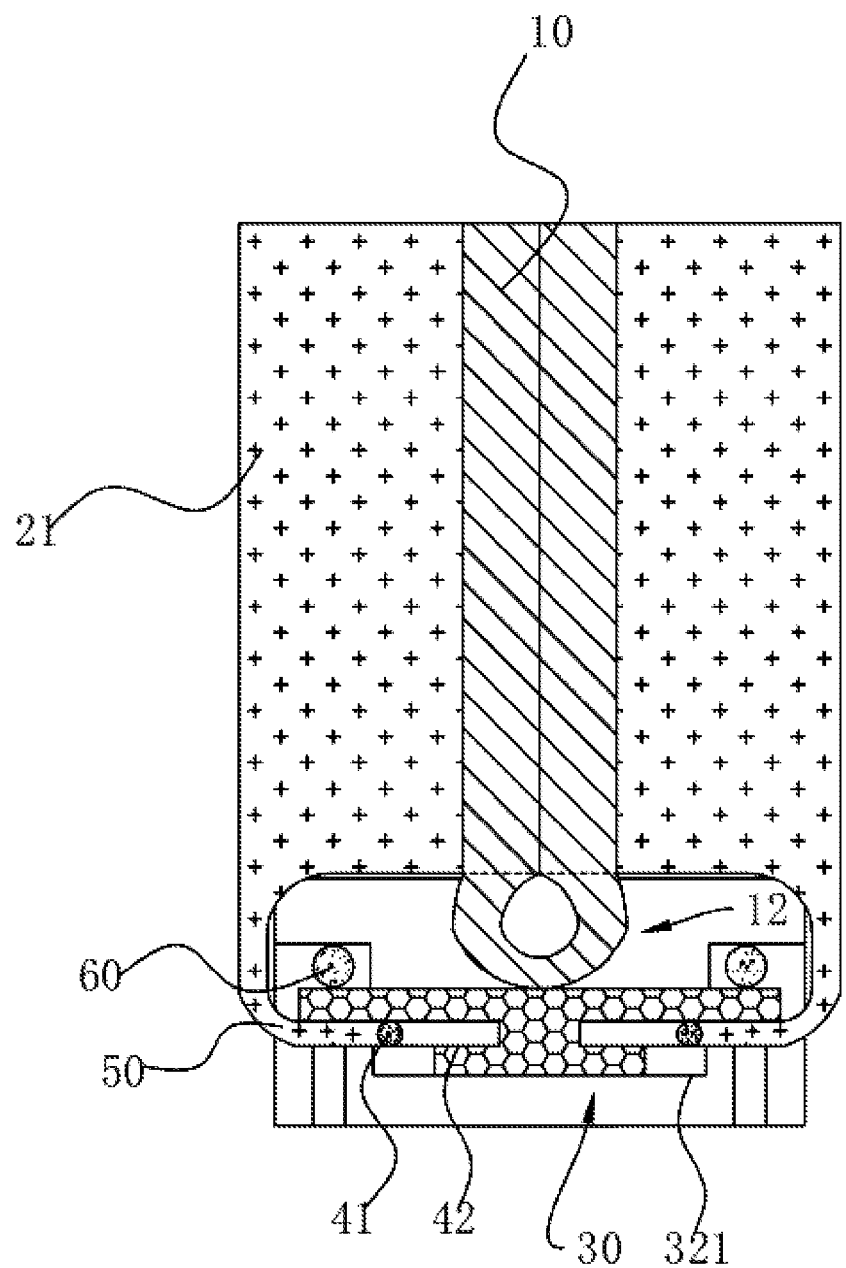
FIG. 3 is a structural view showing the foldable display device in a closed up state.

As shown in FIG. 2 and FIG. 3, when the flexible display panel 10 is in the folded state, the flexible display panel is bended, the two base plates 21 rotate around the first direction and are close to each other during a folding operation of the foldable mechanism 20, which drives the slider to slide and to cause the support 30 to move down and give way to the bendable area 12 of the flexible display panel 10. Thus, the support 30 may be prevented from squeezing the bended part of the flexible display panel 10 during bending of the display device, and causing damage, failure, or wrinkles to the flexible display panel 10.

Note that, as shown in FIG. 3, when the foldable mechanism 20 is closed up, the support 30 descends to a lowest position.

During unfolding of the foldable mechanism 20, the two base plates 21 rotate around the first direction, where each of the base plates 21 departs from each other, and drive the support 30 to move up via the slider. When the foldable mechanism 20 is in the unfolded state, the support 30 moves up to a position where an outer surface of the upper support part 31 is in a same plane with an outer surface of the base plates 21, as shown in FIG. 1.

Figure 4:
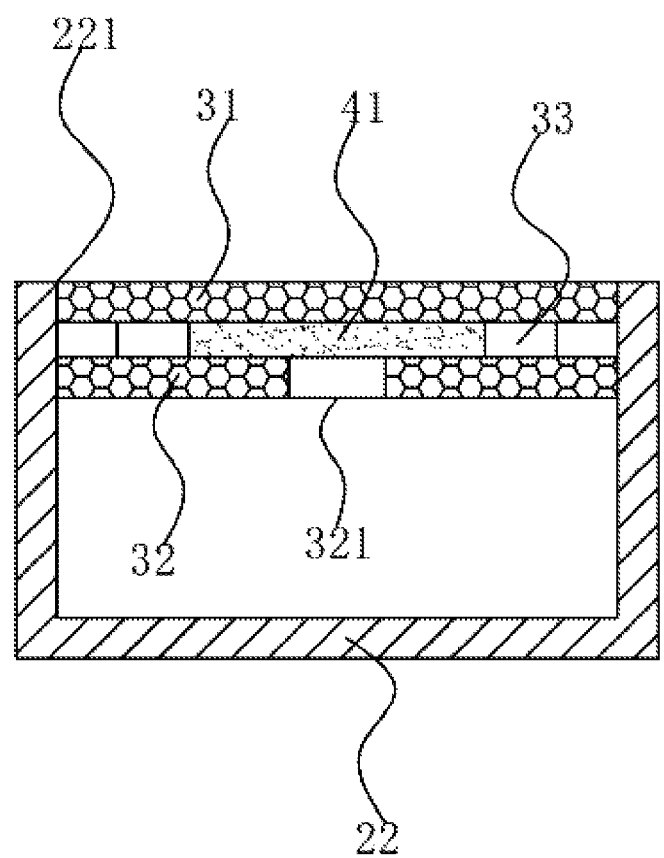
FIG. 4 is a structural view showing a support and a fixing part.

As shown in FIG. 3 and FIG. 4, a cross section of the connecting component 50 is in a hook shape. An opening 321 for passing through by the corresponding connecting component 50 is formed on the lower support part 32 by a side of the lower support part 32 closing to the connecting component 50. When the foldable mechanism 20 is in the unfolded state, the connecting component 50 has one end connected to the first driver portion 41 through the opening 321, and the other end connected to the base plates 21.

In an embodiment, the connecting component 50 and the base plate 21 may be formed as an unitary body through integrated molding.

In an embodiment, a cross section of the fixing part 22 is in a shape of "U", and a vertical section of the support 30 is in a shape of capital "I" shape. The upper support part 31, the lower support part 32, and the connecting component 33 may be formed as an unitary body through integrated molding.

In an embodiment, a dimension and a shape of the outer surface of the upper support part 31 match a dimension and a shape of the opening 221.

Figure 5:
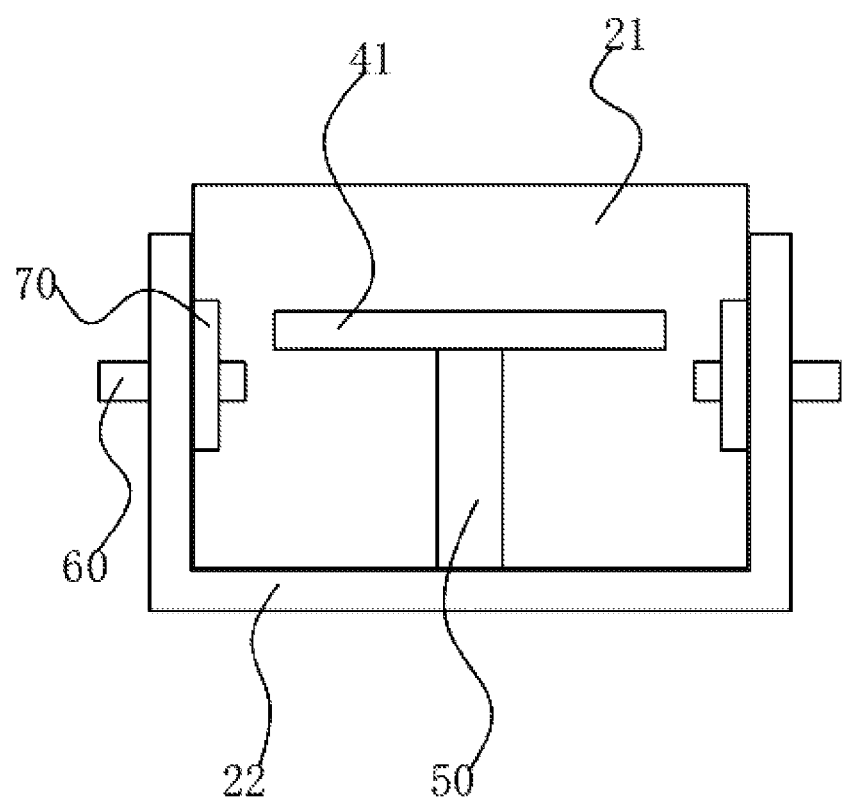
FIG. 5 is a structural view showing a supporting base connecting to the fixing part.

As shown in FIG. 5, in an embodiment, the base plates 21 are pivotally connected with the fixing part 22 through the pivot 60. The connection plates 70 are fixed on the base plates 21. The pivot 60 is horizontally located across and pivotally connected with side walls of the fixing part 22, and rotates around an axis of the pivot 60. The connection plates 70 are fixed on the pivot 60.

Note that, a person with ordinary skills in the art may know the first direction is an axial direction of the pivot 60.

Figure 6:
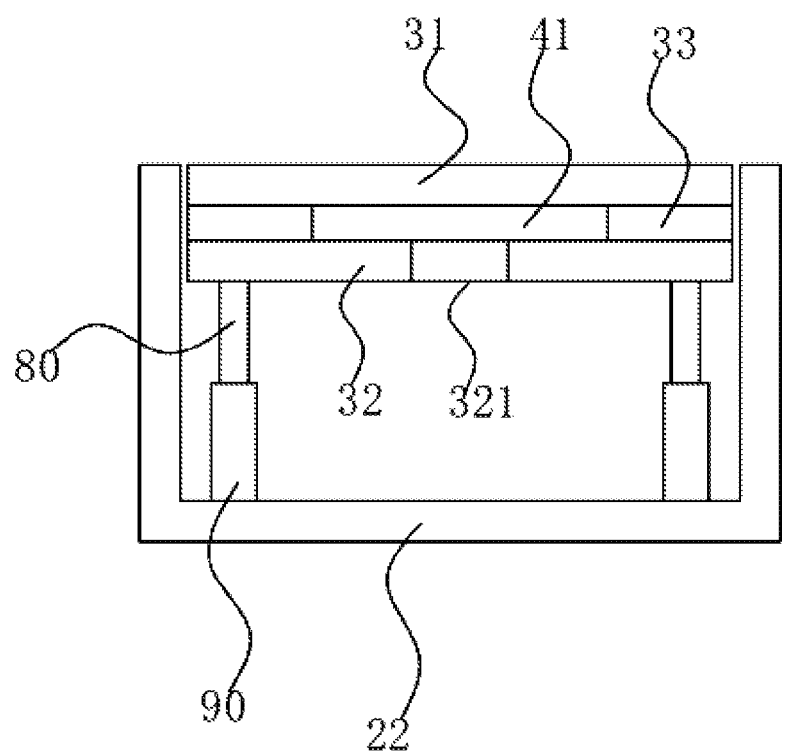
FIG. 6 is a structural view showing a support connecting to the fixing part in an embodiment of the disclosure.
Figure 7:
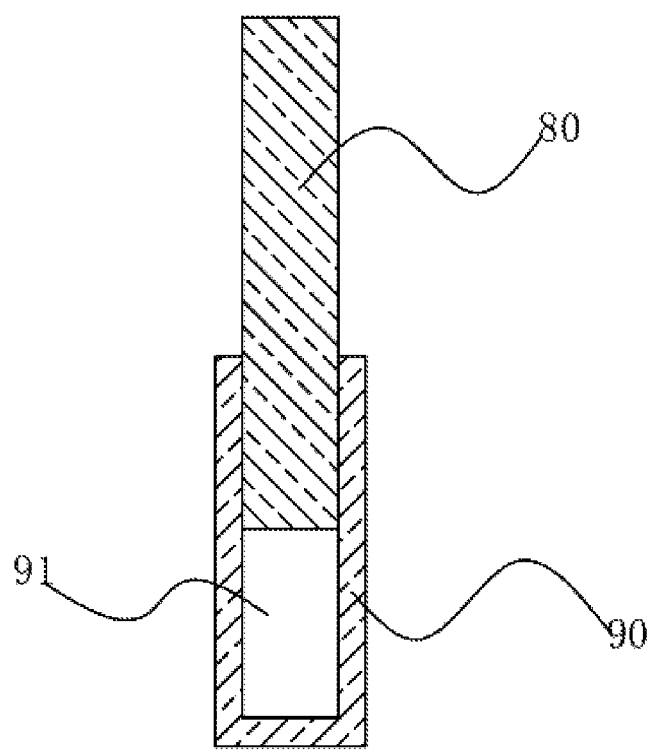
FIG. 7 is a structural view showing a sliding lever connected with a fixed lever.

As shown in FIG. 6 and FIG. 7, in an embodiment, the support 30 is connected to a sliding lever 80, a fixed lever 90 is located at a bottom of the fixing part 22 and has a sliding track 91 that matches the sliding lever 80 for sliding up and down of the sliding lever 80. The sliding lever 80 enters into fixed lever 90 and slides along the sliding track 91.

The sliding lever 80 and the fixed lever 90 cooperatively form the slidably connection between the support and the fixing part 22 and make the support to move in a predetermined track during rotation of the base plates 21.

Note that length of the sliding track 91 may be greater or equal to length of the sliding lever 80 to ensure a moving path of sufficient length for up and down movement of the support 30.

In an embodiment, the sliding lever 80 is located on the upper support part 31.

In an alternative embodiment, as shown in FIG. 6, the sliding lever 80 is located on the lower support part 32.

Further, the sliding lever 80 is fixed on a bottom surface of the lower support part 32, and the sliding lever 80 is set downward. A connecting portion where the sliding lever 80 and the lower support part 32 are connected is close to an end of the lower support part 32.

Further, the fixed lever 90 is fixed on the bottom of the fixed part 22, and the fixed lever 90 is set upward.

In one embodiment, each of the two base plates 21 has one sliding lever 80, and the fixed lever 90 for cooperation with the sliding lever 80 is located on fixed part 22.

Note that, the sliding lever 80 and the support 30 may be formed as an unitary body through one-shot molding. Alternatively, the sliding lever 80 may be fixed on the support 30 via soldering or assembling. The fixed lever 90 and the fixing part 22 may be formed as an unitary body through one-shot molding. Alternatively, the fixed lever 90 may be fixed on the fixing part 22 via soldering or assembling.

Note that, even though FIG. 6 and FIG. 7 show two sets of the sliding lever 80 and the fixed lever 90, more sets of the sliding lever 80 and the fixed lever 90 may be used in real applications.

Note that, in some embodiments, the support 30 and the fixing part 22 may be connected through a combination of a slider and a chute.

Figure 8:
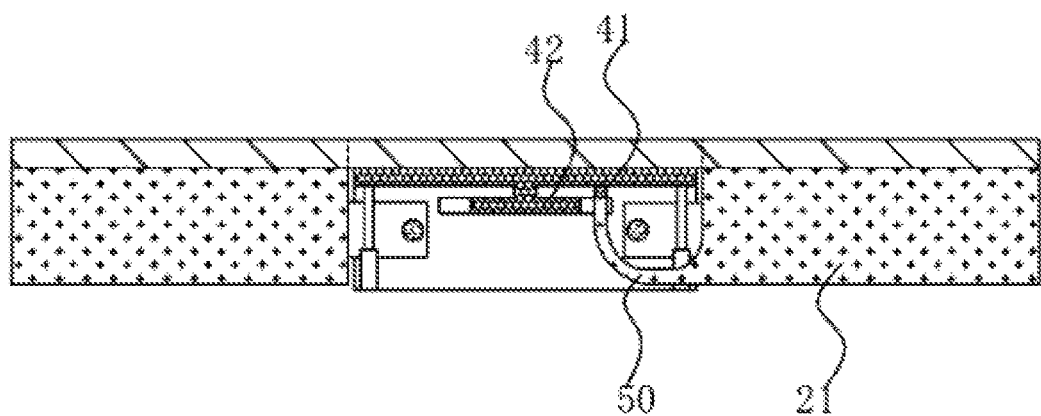
FIG. 8 is a structural view showing a foldable display device in an unfolded state according to another embodiment of the disclosure.

As shown in FIG. 8, in an embodiment, the driving mechanism forms a set of the driving mechanism, and the first driver portion 41 of the driving mechanism is located on one of the base plates 21.

Note that the first driver portion 41 of the driving mechanism is located on any base plate 21, and connected to the base plate 21 through the connecting component 50

It should be noted that even though FIG. 8 shows two openings at the left and right sides of the lower support part 32, in the actual implementation with only one set of the driving mechanism, only one opening 321 may be formed by a side of the lower support section 32 near the connecting component 50.

Beneficial effects of the invention are: when the foldable mechanism 20 is in the unfolded state, the flexible display panel 10 is also in an unfolded state, where a bended part of the flexible display panel 10 is supported by the support 30. When the foldable mechanism 20 is in the folded state, the flexible display panel 10 is bended, the two base plates 21 rotate around the first direction and are close to each other during a folding operation of the foldable mechanism 20, and the first driver portion 41 and the second driver portion 42 cooperatively drive the support 30 to move down and give way to the bended part of the flexible display panel 10. Thus, the support 30 may be prevented from squeezing the bended part of the flexible display panel 10 during bending of the flexible display panel 10, and causing damage or failure to the flexible display panel 10.

The present invention has been described with preferred embodiments thereof and it is understood that many changes and modifications to the described embodiment can be carried out by a person with ordinary skills in the art without departing from the scope and the spirit of the invention that is intended to be limited only by the appended claims.

What is claimed is:

1. A foldable display device comprising:
   a flexible display panel;
   a foldable mechanism comprising two base plates and a fixing part, wherein the flexible display panel is located on and connected to the two base plates, wherein the two base plates are separately located at left side and right side of the fixing part, and pivotally connected to the fixing part, the base plates rotate around a first direction to transit the flexible display panel to a folded state or an unfolded state; and
   a cavity formed in the fixing part, wherein an opening is formed on an upper part of the cavity, the flexible display panel in the unfolded state is located on the fixing part, and a portion of the flexible display panel enters into the cavity through the opening when the flexible display panel is in the folded state.

2. The foldable display device of claim 1, further comprising a support and a driving mechanism;
   wherein the support is located in the cavity of the fixing part, and when the flexible display panel is in an flat state, the support is located at the opening;
   the driving mechanism comprises a first driver portion located on the base plates, and a second driver portion located on the support, wherein the first driver portion and the second driver portion cooperatively drive the support to slide down when the two base plates rotate around the first direction to a closed position where the two base plates are close to each other.

3. The foldable display device of claim 2, wherein the first driver portion is connected to the base plates through a connecting component, the first driver portion and the second driver portion are slidably connected and slidable along a second direction which is in parallel with a lower surface of the fixing part and perpendicular to the first direction, and the first driver portion is located between a pivot of one of the base plates and a pivot of the other one of the base plates.

4. The foldable display device of claim 2, wherein the driving mechanism forms a set of the driving mechanism, and the first driver portion of the driving mechanism is located on one of the base plates.

5. The foldable display device of claim 2, wherein the driving mechanism forms two sets of the driving mechanisms, and the first driver portion of one of the two sets of the driving mechanisms is located on one of the base plates, and a first driver portion of the other one of the two sets of the driving mechanisms is located on the other one of the base plates.

6. The foldable display device of claim 3, wherein the support comprises an upper support part, a lower support part, and a connecting component connecting the upper support part and the lower support part, and the first driver portion is located between the upper support part and the lower support part.

7. The foldable display device of claim 6, wherein an outer surface of the upper support part is in a same plane with an outer surface of the base plates when the foldable mechanism is in an unfolded state.

8. The foldable display device of claim 7, wherein a dimension and a shape of the outer surface of the upper support part match a dimension and a shape of the opening.

9. The foldable display device of claim 7, wherein the flexible display panel comprises a fixed area and a bendable area, and when the foldable mechanism is in the unfolded state, the fixed area is affixed to the base plates, and the bendable area is detachably located on the upper support part.

10. The foldable display device of claim 6, wherein a cross section of the connecting component is in a hook shape, an opening for passing through by the corresponding connecting component is formed a side of the lower support part closing to the connecting component, and when the foldable mechanism is in the unfolded state, the connecting component has one end connected to the first driver portion through the opening, and the other end connected to the base plates.

11. The foldable display device of claim 1, wherein a cross section of the fixing part is in a shape of "U".

12. The foldable display device of claim 2, wherein the support is connected to a sliding lever, a fixed lever is located at a bottom of the fixing part and has a sliding track that matches the sliding lever for sliding up and down of the sliding lever.

* * * * *